United States Patent [19]
Shin

[11] Patent Number: 5,986,696
[45] Date of Patent: Nov. 16, 1999

[54] METHOD AND APPARATUS FOR ADJUSTING A SCREEN GRADIENT IN A VIDEO DISPLAY DEVICE

[75] Inventor: Jin-Hwoan Shin, Kyonggi-do, Rep. of Korea

[73] Assignee: SamSung Electronics Co., Ltd., Kyungki-do, Rep. of Korea

[21] Appl. No.: 09/093,617

[22] Filed: Jun. 9, 1998

[30] Foreign Application Priority Data

Jun. 9, 1997 [KR] Rep. of Korea ................. 97-23544

[51] Int. Cl.⁶ .................................................. H04N 17/04
[52] U.S. Cl. ............................. 348/190; 348/86; 348/189
[58] Field of Search .................................. 348/189, 190, 348/191, 184, 181, 180, 177, 86; 445/36, 37, 45, 47, 68; 430/23, 29; 315/370, 371

[56] References Cited

U.S. PATENT DOCUMENTS

| | | |
|---|---|---|
| 4,547,709 | 10/1985 | French . |
| 4,654,706 | 3/1987 | Davidson et al. ................. 348/190 |
| 4,749,907 | 6/1988 | Boatwright ...................... 348/189 |
| 4,757,239 | 7/1988 | Starkey, IV . |
| 4,769,703 | 9/1988 | Osborne et al. .................. 348/189 |
| 4,790,785 | 12/1988 | Lee et al. . |
| 4,858,006 | 8/1989 | Suzuki et al. .................... 348/189 |
| 4,925,421 | 5/1990 | Van Den Broek . |
| 4,950,192 | 8/1990 | Rietdijk et al. . |
| 5,099,326 | 3/1992 | Hakamada et al. ............... 348/190 |
| 5,136,428 | 8/1992 | Ray . |
| 5,145,432 | 9/1992 | Midland et al. ................... 445/3 |
| 5,216,504 | 6/1993 | Webb et al. ...................... 348/190 |
| 5,240,748 | 8/1993 | Van Esdonk et al. . |
| 5,442,391 | 8/1995 | Hung et al. . |
| 5,526,043 | 6/1996 | Wen ................................. 348/190 |
| 5,638,461 | 6/1997 | Fridge . |
| 5,657,079 | 8/1997 | Tharie et al. ..................... 348/190 |
| 5,677,732 | 10/1997 | Moon .............................. 348/190 |
| 5,739,870 | 4/1998 | Simpson ......................... 348/190 |
| 5,742,338 | 4/1998 | Nose ............................... 348/190 |
| 5,896,170 | 4/1999 | Webb et al. ...................... 348/190 |

*Primary Examiner*—Victor R. Kostak
*Attorney, Agent, or Firm*—Robert E. Bushnell, Esq.

[57] ABSTRACT

A method and a gradient adjusting apparatus for automatically testing and correcting the gradients of a screen of a video display device such as a cathode ray tube (CRT) and a front case in a production assembly line before assembling the CRT and the front case, thereby reducing unnecessary operations and minimizing inferiority of the video display device. In addition, death from shock caused by a high voltage is prevented by automatically supplying the high voltage, a deflection voltage and a gradient test pattern to a CRT assembly which is transported through a conveyer belt.

26 Claims, 11 Drawing Sheets

METHOD AND APPARATUS FOR ADJUSTING A SCREEN GRADIENT IN A VIDEO DISPLAY DEVICE

CLAIM FOR PRIORITY

This application makes reference to, incorporates the same herein, and claims all benefits accruing under 35 U.S.C. §119 from an application for *METHOD AND APPARATUS FOR ADJUSTING A SCREEN GRADIENT IN A VIDEO DISPLAY DEVICE* earlier filed in the Korean Industrial Property Office on the 9$^{th}$ of Jun. 1997, and there duly assigned Serial No. 23544/1997, a copy of which application is annexed hereto.

BACKGROUND OF THE INVENTION

1. Technical Field

The present invention relates to a method and apparatus for adjusting a screen gradient in a video display device such as a cathode ray tube (CRT) assembly in a monitor manufacturing line, and more particularly to a method and apparatus for adjusting a screen gradient in a video display device with minimal work from a skilled human operator by automatically testing and correcting the gradients of a screen of the cathode ray tube (CRT) and a front case in a monitor manufacturing line before assembling the cathode ray tube (CRT) and the front case.

2. Related Art

Generally, a video display device such as a cathode ray tube (CRT) as manufactured, for example, in U.S. Pat. No. 4,790,785 for *Means And Method For Manufacture For A High Resolution Color Cathode Ray Tube* issued to Lee et al., U.S. Pat. No. 4,950,192 for *Method Of Manufacturing Of Color Display Tube* issued to Rietdijk et al., U.S. Pat. No. 4,925,421 for *Method For Manufacturing A Color Cathode Ray Tube And A Color Cathode Ray Tube* issued to van den Broek, U.S. Pat. No. 5,136,428 for *Flat-Plate Optical Device Having Gradient Index Of Refraction For Correcting Spatial Distortions* issued to Ray, and U.S. Pat. No. 5,240,748 for *Method Of Manufacturing A Display Window For A Display Device* issued to Van Esdonk et al., must be tested and adjusted to correct display deviations and distortions.

Traditionally, the test and adjustment of display deviations and distortions mainly rely upon physical labor. More recently, advanced testing techniques using electro-optical systems such as disclosed in U.S. Pat. No. 4,757,239 for *CRT Display System With Automatic Alignment Employing Personality Memory* issued to Starkey, IV, U.S. Pat. No. 5,442,391 for *Method And A System For Testing A Cathode Ray Tube Or Like Products* issued to Hung et al., and U.S. Pat. No. 5,638,461 for *Stereoscopic Electro-Optical System For Automated Inspection And/Or Alignment Of Image Devices On A Production Assembly Line* issued to Fridge, are used to conduct necessary tests and adjustments on a production assembly line.

Typically, when power and a test pattern for testing the gradient are supplied to the CRT, a gradient line is horizontally displayed to the screen of the CRT. At this time, an operator adjusts the screen gradient by controlling the position of a front case of the CRT in order for a line formed by an outer surface of the front case to be parallel to the gradient line formed by the gradient test pattern. Afterwards, the gradient of the CRT is adjusted by fixing the front case to the CRT with a screw. Once the CRT and the front case are assembled, however, the gradient can only be adjusted if the screw is removed. As a result, the production assembly line becomes inefficient and the quality of the video display device is lowered. In addition, since the number of skilled human operators and the unnecessary operations increase in the production assembly line for testing the gradient of the CRT, productivity is reduced. Other techniques of adjusting the gradient before assembling the CRT and the front case are available. However, the common AC power and the gradient test pattern are supplied to the CRT through manual operation by way of a separate printed circuit board (PCB) assembly to the gradient adjusting apparatus.

SUMMARY OF THE INVENTION

Accordingly, it is therefore an object of the present invention to provide a gradient adjusting apparatus for adjusting a gradient of a video display device with minimum production and maximum efficiency in a production assembly line.

It is another object of the present invention to provide a test technique for testing and adjusting a gradient of a video display device in a production assembly line prior to assembling a cathode ray tube (CRT) and a front case in order to enhance productivity and quality.

It is yet another object of the present invention to prevent a test technique for testing and adjusting a gradient of a video display device in a production assembly line after automatically supplying a high voltage, a deflection voltage and a gradient test pattern to a CRT assembly which is transported through a conveyer belt.

According to one aspect of the present invention, a method for adjusting a gradient of a video display device by testing the gradient by a common alternating current (AC) power and a gradient test pattern to the CRT assembly includes the steps of locating a front case on which the CRT assembly is loaded on a working plate; displaying a pattern image by supplying the common alternating current (AC) power, a heater preheating voltage and the gradient test pattern to the CRT assembly; picking up the displayed pattern image by an image pickup unit and displaying the picked-up pattern image on a monitor; and adjusting the position of the CRT assembly so that the picked-up pattern image and a reference pattern can be parallel each other after comparing the pattern image displayed on the screen of the monitor with the reference pattern located at the screen of the monitor and then assembling the CRT assembly to the front case.

Preferably, the gradient test pattern is directly supplied to an electronic gun of the CRT assembly. In addition, the gradient test pattern may be supplied to the electronic gun of the CRT assembly after preheating the heater of the electronic gun by applying the preheating voltage.

According to another aspect of the present invention, a method for adjusting a gradient of a video display device includes the steps of: locating the front case on which the CRT assembly is loaded on a working plate; supplying a heater preheating voltage by inserting an aging socketjig into an electronic gun of the CRT assembly; supplying a deflection voltage by inserting a deflection voltage supply unit to a deflection yoke connector of the CRT assembly; forming a closed circuit by contacting a closed circuit forming unit to a ground point of the CRT assembly; supplying an anode voltage by contacting an anode voltage supply unit to an anode of the CRT assembly; supplying the gradient test pattern to the electronic gun of the CRT assembly through the aging socket jig and then displaying the supplied pattern on the screen; displaying the displayed pattern image on the monitor by picking up the displayed pattern image by the image pickup unit; and adjusting the position of the CRT assembly so that the displayed pattern image and the reference pattern can be parallel each other after comparing the pattern image displayed on the screen of the monitor with the reference pattern located at the screen of the monitor and then assembling the CRT assembly to the front case.

Preferably, the high voltage discharge unit is in contact with the anode of the CRT assembly to discharge the anode voltage after assembling the CRT assembly to the front case. In addition, the aging socket jig, the deflection voltage supply unit, the closed circuit forming unit and the anode voltage supply unit are detached in reverse order after the CRT assembly and the front case are assembled.

According to another aspect of the present invention, an apparatus for adjusting a gradient of a video display device which tests the gradient by supplying a common alternating current (AC) power and a gradient test pattern to a cathode ray tube (CRT) assembly, includes: a fixing unit for stably fixing a front case loading the CRT assembly which is transported on a conveyer belt; a pattern forming unit which forms a test pattern for testing the gradient; a PCB assembly for testing the gradient which generates an anode voltage, a deflection voltage and a heater preheating voltage based on the common AC power and generates a pattern obtained from the pattern forming unit; a unit for selectively being attachable and detachable to/from the CRT assembly when entering into the gradient test which is located at the rear part of the fixing unit, supplying the anode voltage, the deflection voltage, the heater preheating voltage and the pattern obtained by the PCB assembly for testing the gradient, and displaying the pattern image on the screen of the CRT assembly; an image pickup unit for picking up the pattern image displayed on the screen of the CRT assembly; and a monitor unit having a reference pattern in order to monitor the gradient by displaying the pattern image which is obtained by the image pickup unit.

In the apparatus for adjusting the gradient of the video display device according to the present invention, the unit for selectively being attached/detached to/from the CRT assembly includes: an anode voltage supply unit which is attached/detached to/from the anode of the CRT assembly with a rectilinear movement when testing the gradient and supplies the anode voltage of the PCB assembly for testing the gradient; a closed circuit forming unit which is attached/detached to/from a ground point of the CRT assembly with the rectilinear movement and forms the closed circuit; an aging socket jig unit which is attachably/detachably connected to the electronic gun of the CRT assembly and supplies the heater preheating voltage and gradient test pattern; a deflection voltage supply unit which is attachably/detachably connected to a deflection yoke connector of the CRT assembly and supplies the deflection voltage; and a high voltage discharge unit which is attached/detached to/from the anode of the CRT assembly with the rectilinear movement after testing the gradient and discharges the anode voltage.

The deflection voltage supply unit includes a deflection yoke connector body which is received in a connecting hole of the deflection yoke connector; a cylinder and a moving rod which are located inside of the deflection yoke connector body and perform the rectilinear movement by an air pressure; a pressing unit which is fixed at an end of the moving rod and performs a forward/backward movement by the operation of the cylinder; a pin board which is fixed at an end of the pressing unit and at which a plurality of connecting pins received in a pin hole of the deflection yoke connector are fixed; and a power supply wire which is connected to the connecting pin of the pin board and transmits and supplies the deflection voltage to the deflection yoke connector.

Before assembling the CRT assembly to the front case by the fixing unit such as a screw, the gradient test pattern, anode voltage, heater preheating voltage and the deflection voltage are automatically supplied to the CRT assembly directly through the moving and contacting unit. After testing and adjusting the gradient using a distance between the reference pattern and the pattern through the monitoring unit, the CRT assembly and the front case are fixed by the fixing unit. Accordingly, by testing and adjusting the gradient in the monitor manufacturing line prior to assembling the CRT assembly to the front case, the productivity is enhanced and unnecessary operations are reduced, thereby realizing a stabilization of the quality of the product.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2A is a perspective view illustrating the CRT of a test target supplied through the conveyor belt of the production assembly line;

FIG. 2B is a perspective view illustrating the CRT and a front case;

FIG. 2C is a perspective view illustrating the CRT assembly including a printed circuit board (PCB) and a front case;

FIG. 2D is a perspective view illustrating application of an alternating current (AC) power and a gradient test pattern to the CRT assembly; and FIG. 2E is a view illustrating that the gradient is tested with a distance between the front case of the CRT assembly and the gradient test pattern;

DETAILED DESCRIPTION OF THE PREFERRED EMBODIMENT

Figure 1:
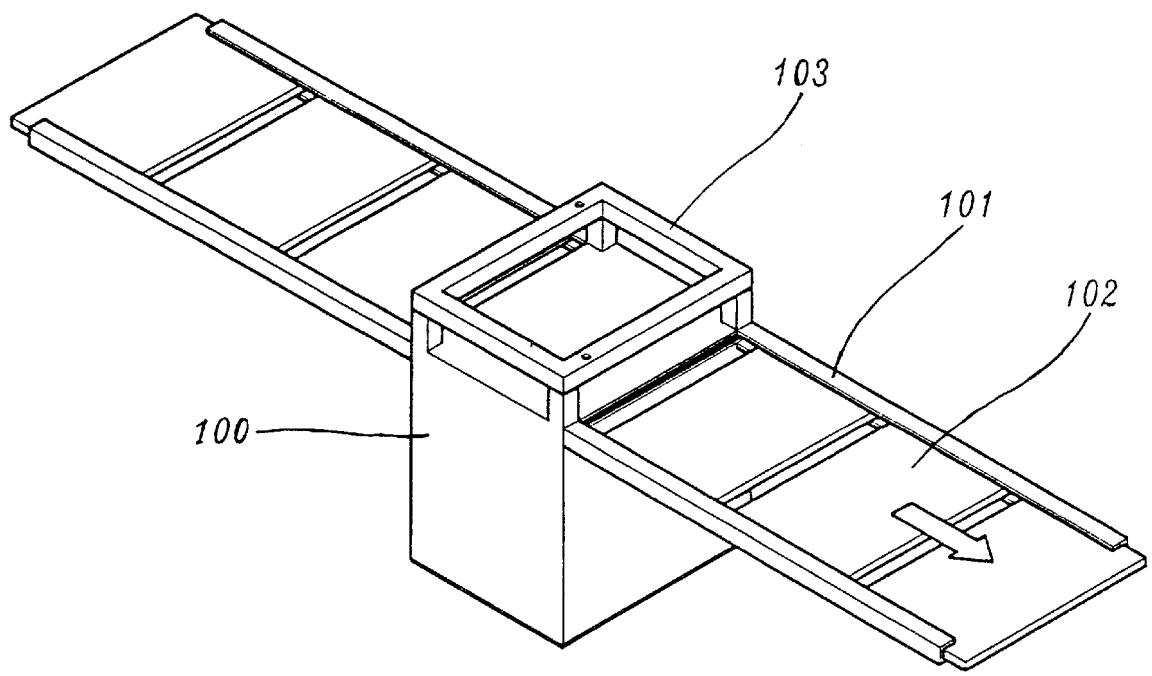
FIG. 1 illustrates a typical apparatus for adjusting a gradient of a cathode ray tube (CRT) in a production assembly line.

Referring now to the drawings and particularly to FIG. 1, which illustrates a typical gradient adjusting apparatus 100 for adjusting a gradient of a video display device such as a cathode ray tube (CRT) in a production assembly line. A human operator must manually position the CRT assembly on a palette 102 which is transported through a conveyer belt 101 to a working plate 103 for gradient adjustment, then four corners of a front case are fixed to the CRT by a locking unit such as screw. When the gradient of the CRT is adjusted, the operator lifts the CRT assembly whose gradient adjustment is completed, i.e., the CRT assembly to which the front case is locked with the screw, and then puts down the CRT assembly on the palette 102 on the conveyor belt 101 from the working plate 103 of the gradient adjusting apparatus 100. Afterwards, the next operation is performed.

The process for adjusting the gradient between the CRT and the front case through the gradient adjusting apparatus 100 will now be described in detail with reference to FIGS. 2A to 2E hereinbelow.

Figure 2A:
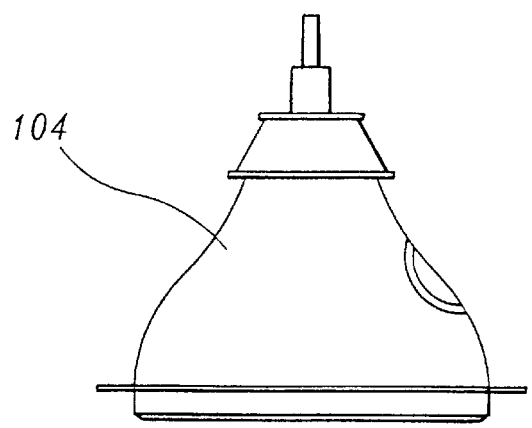
FIGS. 2A to 2E are views illustrating a process for adjusting the gradient of the CRT as shown in FIG. 1.
Figure 2B:
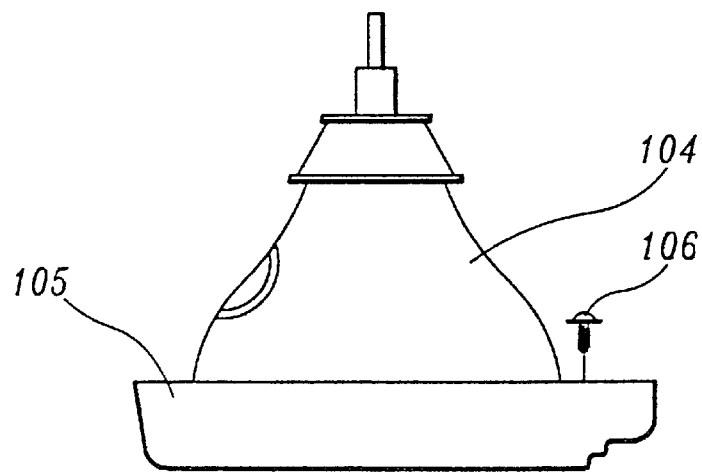

In order to adjust the gradient of the CRT in the production assembly line, when the CRT 104 is transported through the conveyor belt 101 located on the palette 102 as shown in FIG. 2A, the operator in the production assembly line assembles the front case 105 to the transported CRT 104 as shown in FIG. 2B and fixes the front case 105 to the CRT 104 by screw 106. Then the assembled CRT is transported to a next operating line through the palette 102 and the conveyor belt 101.

Figure 2C:
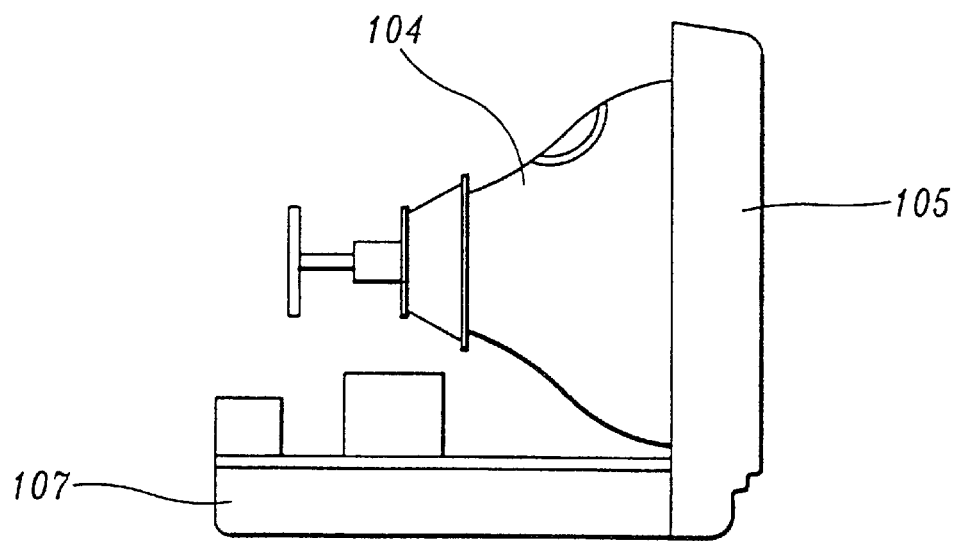
Figure 2D:
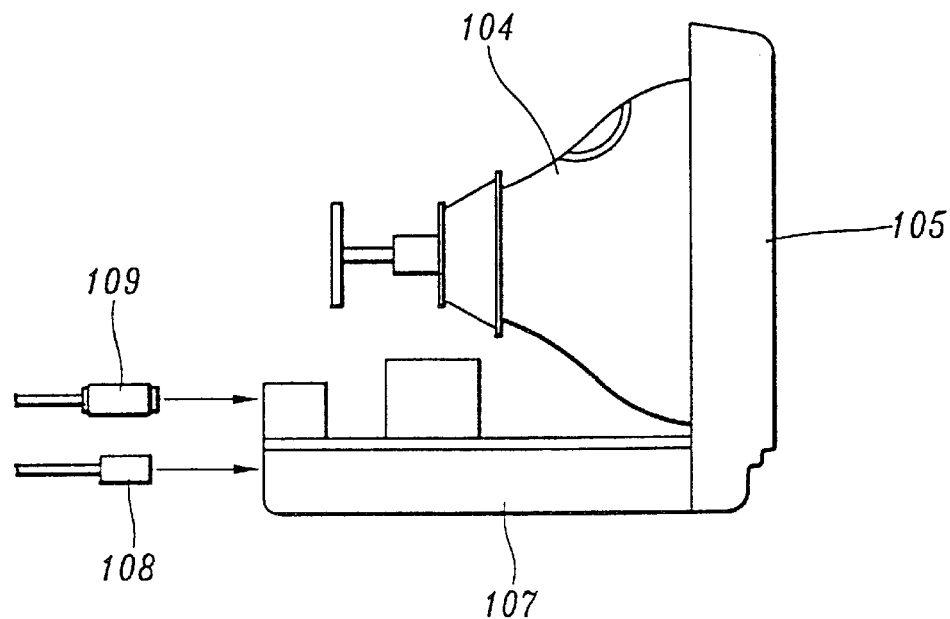

In the next operating line, the operator locks a printed circuit board (PCB) 107 in which a component part such as a flyback transformer is arranged to the CRT assembly in which the CRT 104 and the front case 105 are connected as shown in FIG. 2C, and transports the same to a next operating line in which the gradient adjusting apparatus 100 is established through the conveyor belt 101. As described above, when CRT assembly to which the PCB assembly 107 is locked is transported through the conveyor belt 101, the operator who is located near the gradient adjusting apparatus 100 lifts the CRT assembly from the palette 102 and places on the working plate 103. A common alternating current (AC) power and a test pattern for testing the gradient of the CRT are supplied thereto by inserting a common AC power cable 108 and a signal supply cable 109 to the PCB assembly 107 in which the component part such as the flyback transformer is arranged and assembled, as shown in FIG. 2D.

Figure 2E:
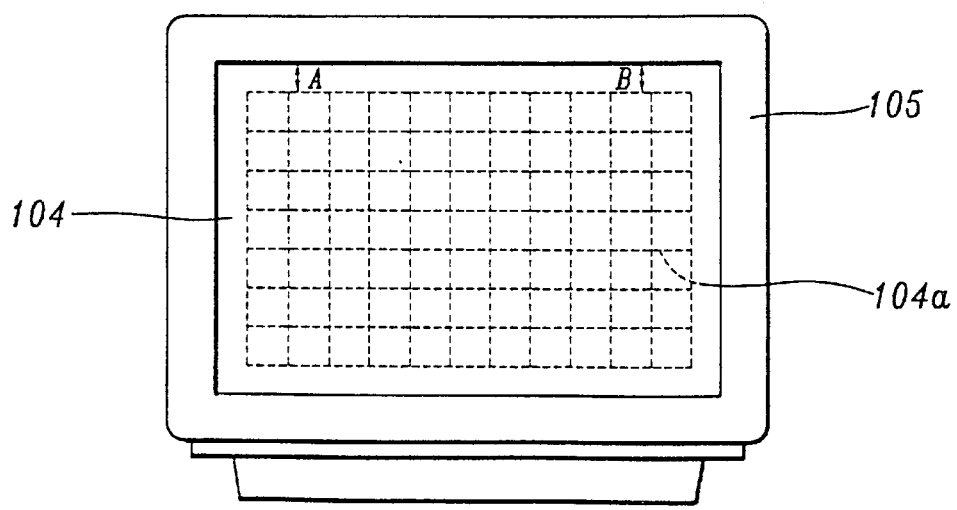

When the common AC power and the gradient test pattern are supplied to the CRT assembly, a test pattern 104a is displayed on the screen of the CRT 104 as shown in FIG. 2E, and the operator checks whether a line formed by the upper outer surface of the front case 105 and the gradient line formed by the gradient test pattern 104a are parallel each other. In other words, the operator checks whether a distance A which is an interval between the upper frame of the front case 105 and the test pattern 104a at one end is the same as a distance B which is an interval between the upper frame of the front case 105 and the test pattern 104a at the other end. In the case that two lines are not parallel each other, i.e., A is not the same as B, the screw 106 which fixes the front case 105 and the CRT 104 is unlocked and the gradients is adjusted in order that the distances A and B which are the intervals between the upper frame of the front case 105 and the gradient test pattern 104a of the CRT 104 at both ends can be the same. Afterwards, by tightening the screw 106 again, the CRT 104 and the front case 105 are fixed finally.

However, the gradient of the CRT is checked and adjusted by supplying the common AC power and the test pattern when the CRT and the front case are assembled through a locking unit such as a screw. Accordingly, when adjusting the gradient in the production assembly line, in the case that the gradients of the front case and the CRT are not the same, it has a problem in that the gradients may be adjusted again after unlocking the screw. As a result, the inferiority in each line becomes great and thereby the quality of the video display device is lowered. In addition, since the number of operators and the unnecessary operations increase in the line for testing the gradient, the productivity is reduced.

Moreover, other techniques of adjusting the gradient of the CRT before assembling the CRT and the front case are considered. However, it also has a problem in that the common AC power and the gradient test pattern are supplied through manual operation by providing a separate PCB assembly to the gradient adjusting apparatus. Accordingly, it is necessary to adjust the gradient of the video display device with less difficulty and minimal unnecessary operations.

Figure 3:
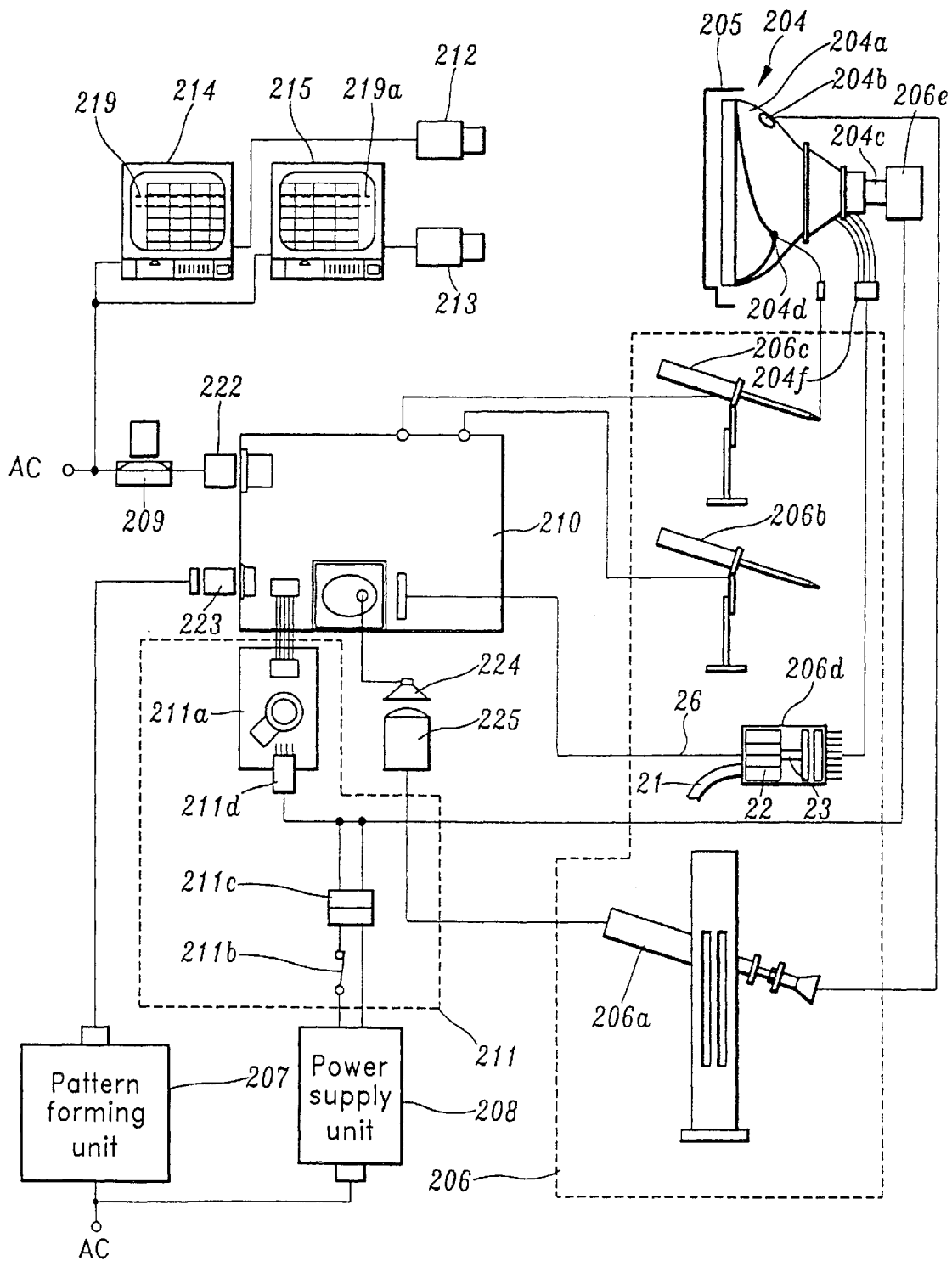
FIG. 3 is a structural view of an apparatus for adjusting a gradient of a cathode ray tube (CRT) according to the principles of the present invention.
Figure 4:
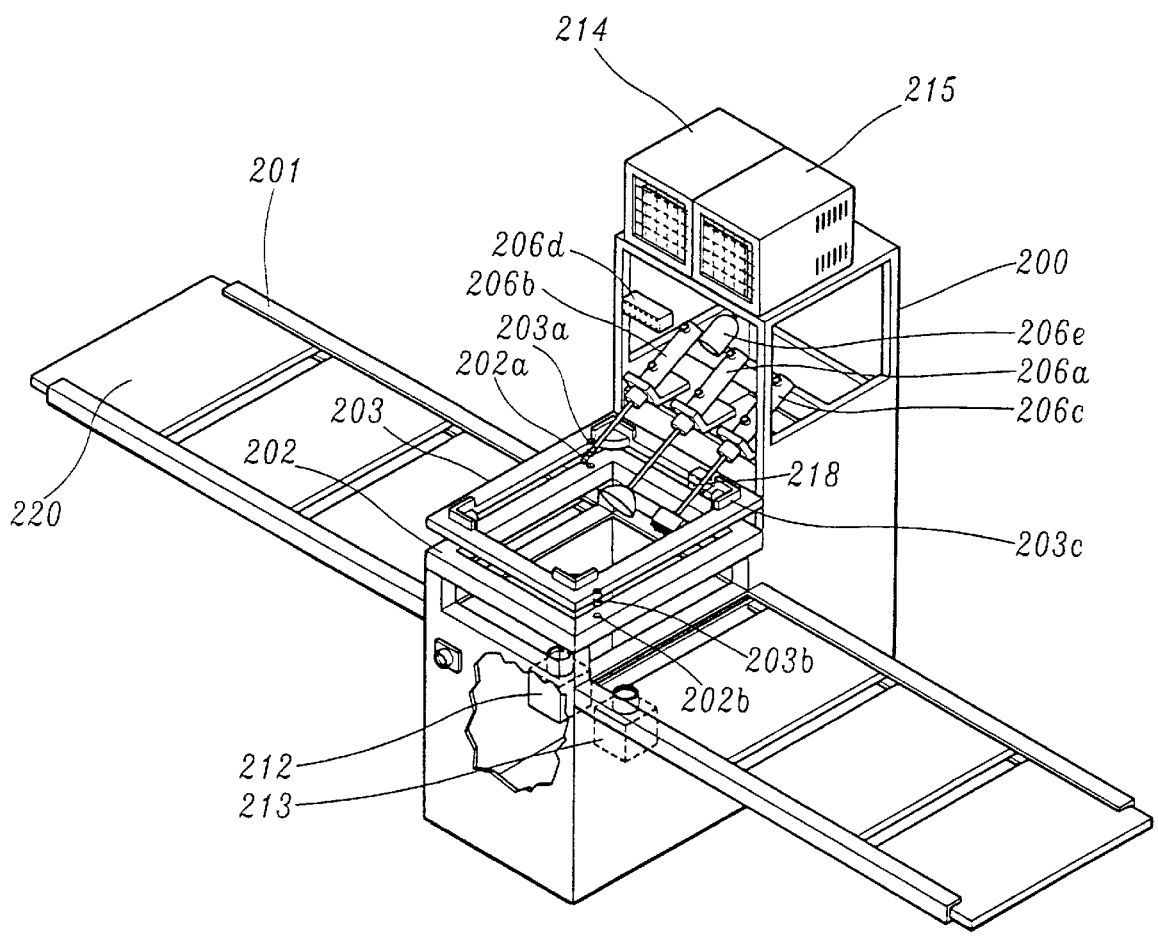
FIG. 4 is a perspective view of an apparatus for adjusting the gradient of the CRT of FIG. 3.
Figure 5:
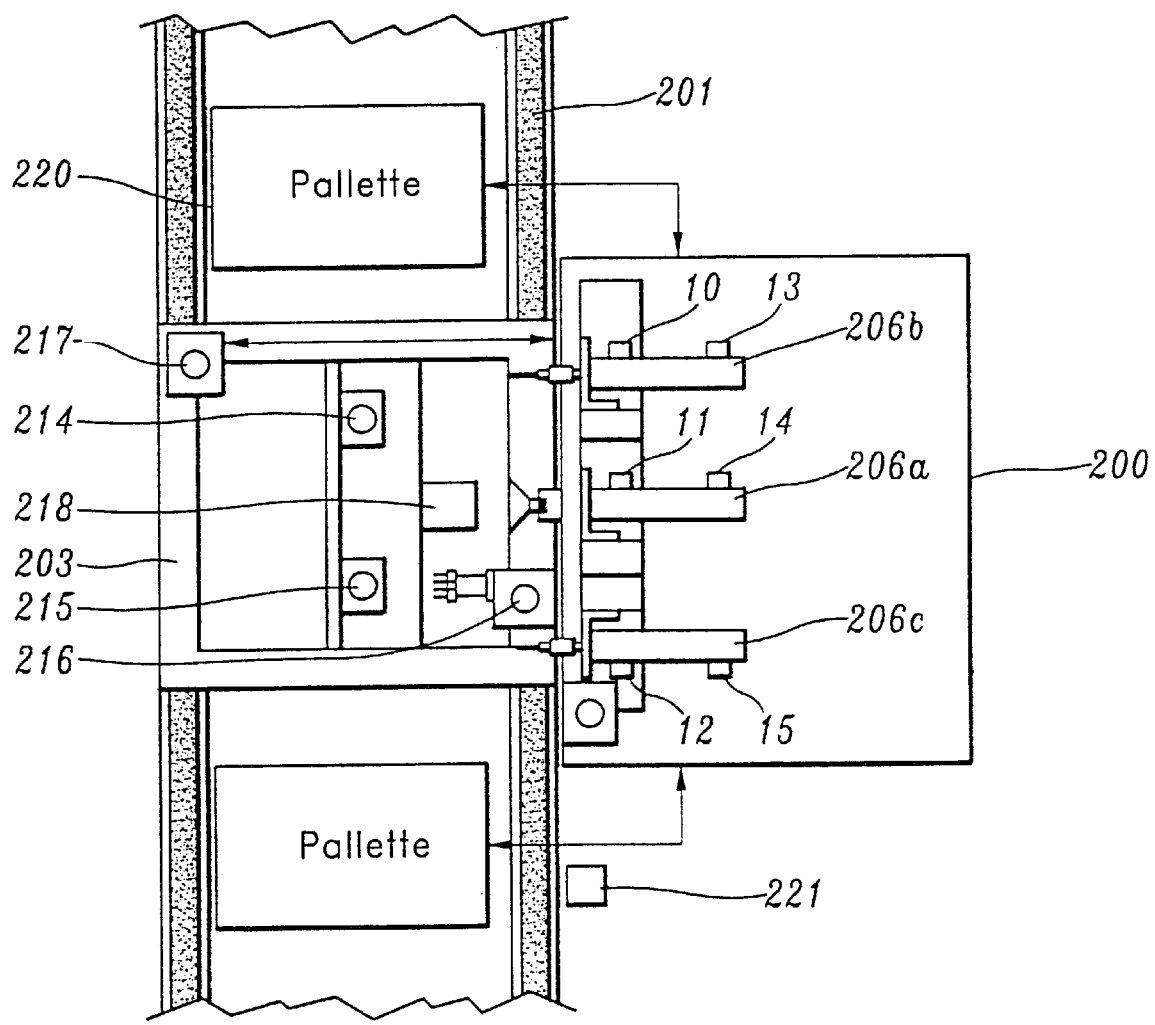
FIG. 5 is a plan view of an apparatus for adjusting the gradient of the CRT of FIG. 3.
Figure 6:
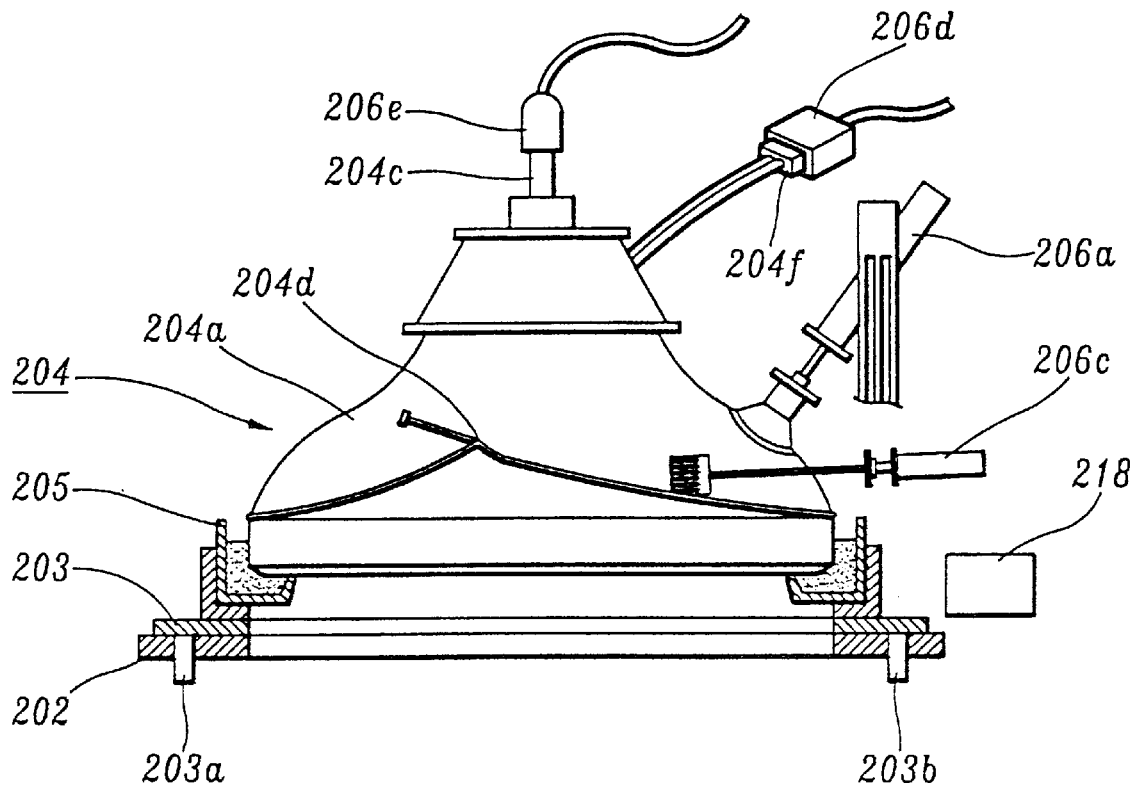
FIG. 6 is a lateral view of an apparatus for adjusting the gradient on which the CRT assembly of the test target is mounted.

Turning now to FIGS. 3 to 7 which illustrate an apparatus for adjusting a gradient of all types of video display device according to the principles of the present invention. The video display device as contemplated by the present invention includes a cathode ray tube (CRT) and a liquid crystal display (LCD). In particular, FIG. 3 provides a structural view of an apparatus for adjusting the gradient of the CRT. Likewise, FIG. 4 provides a perspective view of an apparatus for adjusting the gradient of the CRT of FIG. 3. In addition, FIG. 5 provides a plan view of an apparatus for adjusting the gradient of the CRT of FIG. 3. FIG. 6 provides a lateral view of the apparatus for adjusting the gradient on which the CRT assembly of a test target is mounted.

The gradient test apparatus for adjusting the gradient of the CRT according to the present invention comprises a pair of conveyor belts 201 for transporting horizontally the test target object whose gradient is to be tested; a palette 220 which is located and transported on the pair of conveyor belt 201; a working plate box 200 which is located on the conveyor belt 201; a start switch 216/a stop switch 217 which are located at the front surface of the working plate box 200 and drives/stops the apparatus for testing the gradient; a working plate 202 which is attached to the working plate box 200 and has a pair of fixing grooves 202a and 202b facing diagonally each other at the upper part; a rectangular fixing plate 203 which is freely connected to the upper part of the working plate 202 and stably fixes a front case 205 on which a CRT assembly 204 is mounted which is located and transported on the palette 220; a set location sensing unit 218 which is located at the center of the rear end of the working plate 202 and senses the positional state of the CRT assembly 204 which is fixed at the fixing plate 203; a power switching unit 209 for switching a common alternating current (AC) power which is input; a pattern forming unit 207 which is located in the working plate box 200 of the lower part of the conveyor belt 201 where the fixing plate 203 is located and forms a pattern for testing the gradient being operated by the common AC power supplied by the power switching unit 209; a power supply unit 208 which is located in the working plate box 200 and generates a heater preheating voltage by lowering the inputted common AC power to a voltage of a predetermined level and converting the lowered voltage into the direct current voltage; a printed circuit board (PCB) assembly 210 for forming an anode voltage (high voltage), a deflection voltage, and the heater preheating voltage based on the common AC power which is input through the power switching unit 209 and generating the pattern which is input by the pattern forming unit 207; a preheating voltage selecting unit 211 for selectively supplying the heater preheating voltage generated by the PCB assembly 210 for testing the gradient and the heater preheating voltage generated by the power supply unit 208; a moving and contacting unit 206 which is located in the rear part of the fixing plate 203, transmits and displays the high voltage and the deflection voltage generated by the PCB assembly 210 for testing the gradient, the pattern for testing the gradient and the heater preheating voltage of the heater preheating voltage selecting unit 211 being selectively attached/detached to/from the anode 204b of the CRT assembly 204, a deflection yoke connector 204f, a ground unit 204d and a neck unit 204c when starting the gradient test, and discharges the high voltage which is charged in the CRT 204a of the CRT assembly 204 after testing the gradient; first and second cameras 212 and 213 which are located at proper positions at the lower part of the fixing plate 203 and picking up a pattern image for testing the gradient which is displayed on the screen of the CRT 204a of the CRT assembly 204; first and second monitors 214 and 215 which display the pattern image for testing the gradient which is input after picked up through first and second cameras 212 and 213 on the screen; reference patterns 219 and 219a which are located parallel to the screens of the first and second monitors 214 and 215 and become the test target of the screen gradient against the pattern image for testing the gradient; and a discharging set sensing unit 221 which is located apart by a predetermined distance on the conveyor belt 201 and detects whether the CRT assembly 204 is discharged after the gradient test is completed.

As shown in FIG. 4, the fixing plate 203 includes fixing bars 203a and 203b which are protrusively formed facing diagonally each other at the bottom and inserted and fixed to the fixing groove 202a and 202b of the working plate 202; and a fixing projection 203c which is formed corresponding to the size of the CRT assembly 204 at the upper parts of each corners of the fixing plate 203 and stably fixes the front case 205 on which the CRT assembly 204 is loaded.

In addition, as shown in FIG. 3, the preheating voltage selecting unit 211 includes a CRT socket PCB 211 a which is electrically connected to the PCB assembly 204 and supplies the heater preheating voltage and the pattern; a CRT socket jig 211d which is connected to the CRT socket PCB 211a; a control relay 211b for switching the heater preheating voltage which is supplied from the power supply unit 208; and a heater connector 211c which is electrically connected to the control relay 211b and the CRT socket jig 211d and transmits the heater preheating voltage.

The moving and contacting unit 206 includes an anode voltage supply unit 206a for transmitting and supplying the high voltage of the PCB assembly 210 for testing the gradient to the anode 204b of the CRT assembly 204 through the rectilinear movement by the air pressure according to the operation of a start switch; a closed circuit forming unit 206c which is attached/detached to/from the ground unit 204d of the CRT assembly 204 by the air pressure according to the operation of the start switch 216 and forms a closed circuit to the PCB assembly 210 for testing the gradient; an aging socket jig 206e which is attachably/detachably connected to the neck unit 204c of the CRT assembly 204 and transmits and supplies the pattern and the heater preheating voltage selected by the preheating voltage selecting unit 211; a deflection voltage supply unit 206d which is attachably/detachably connected to the deflection yoke connector 204f of the CRT assembly 204 and transmits and supplies the deflection voltage; a high voltage discharge unit 206b which is attached/detached to/from the anode 204b of the CRT assembly 204 by the rectilinear movement after testing the gradient and discharges the high voltage; first to third forward sensor 10 to 12 for sensing the forward state of the high voltage discharge unit 206b, the anode voltage supply unit 206a and the closed circuit forming unit 206c and first to third backward sensor 13 to 15 for sensing the backward state of the high voltage discharge unit 206b, the anode voltage supply unit 206a and the closed circuit forming unit 206c.

Figure 7:
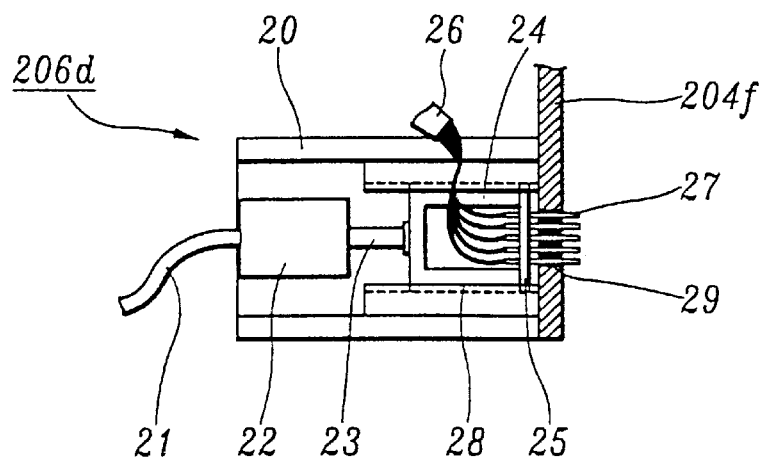
FIG. 7 is a detailed sectional view of a deflection voltage supply unit of FIG. 3.
Figure 8A:
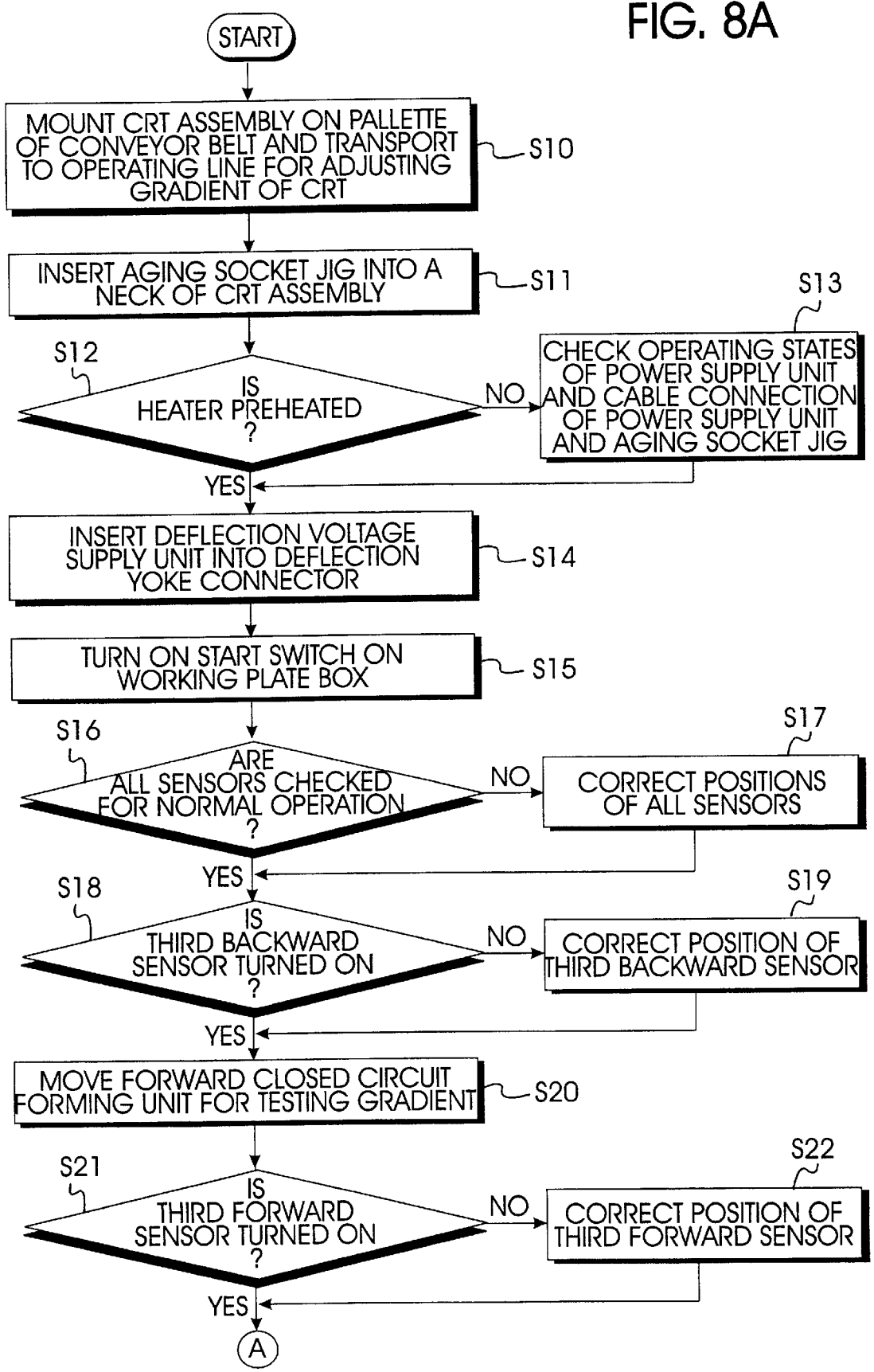
FIGS. 8A to 8D are flowcharts of a process of adjusting the gradient of the CRT according to the principles of the present invention.
Figure 8B:
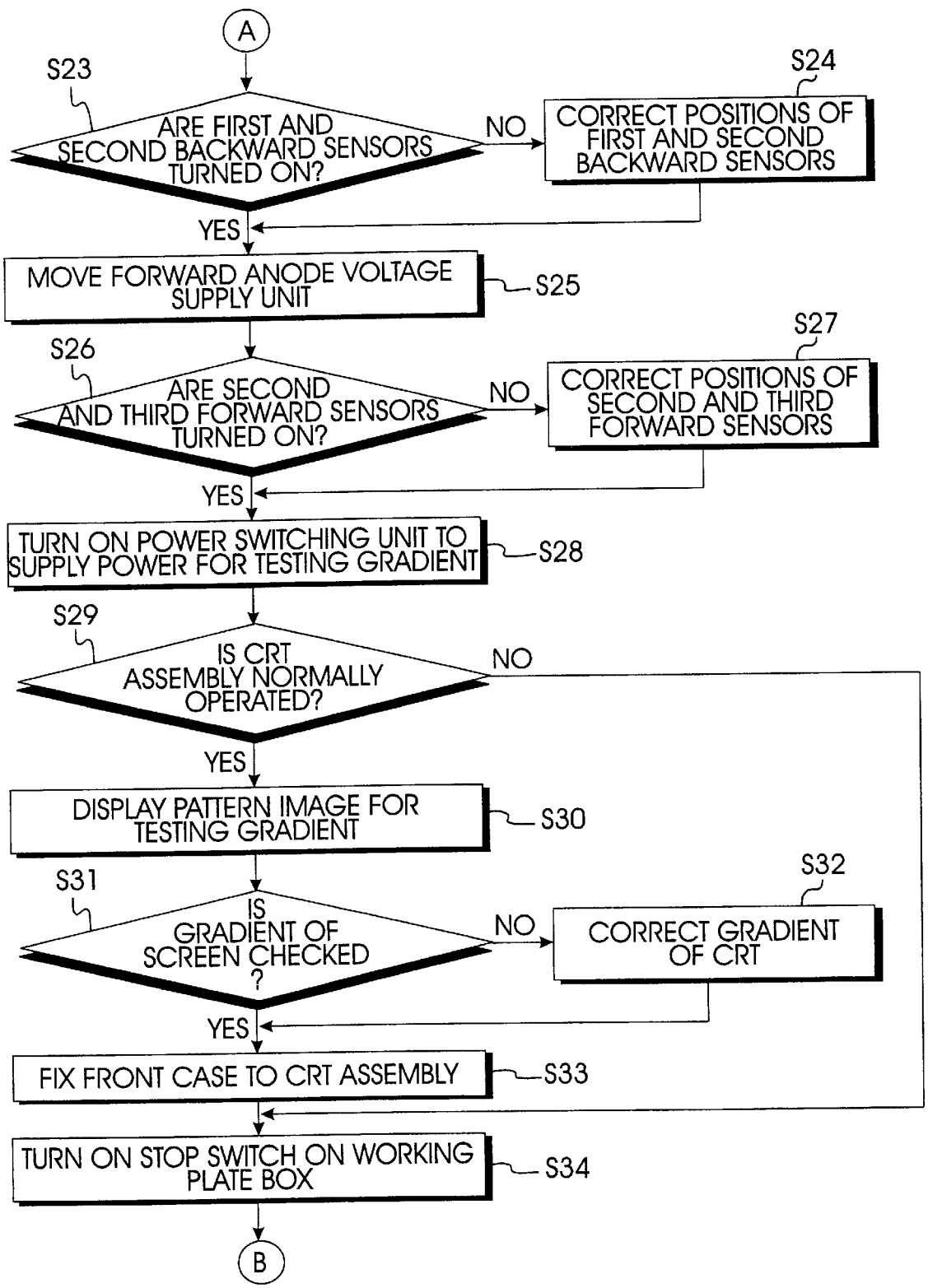
Figure 8C:
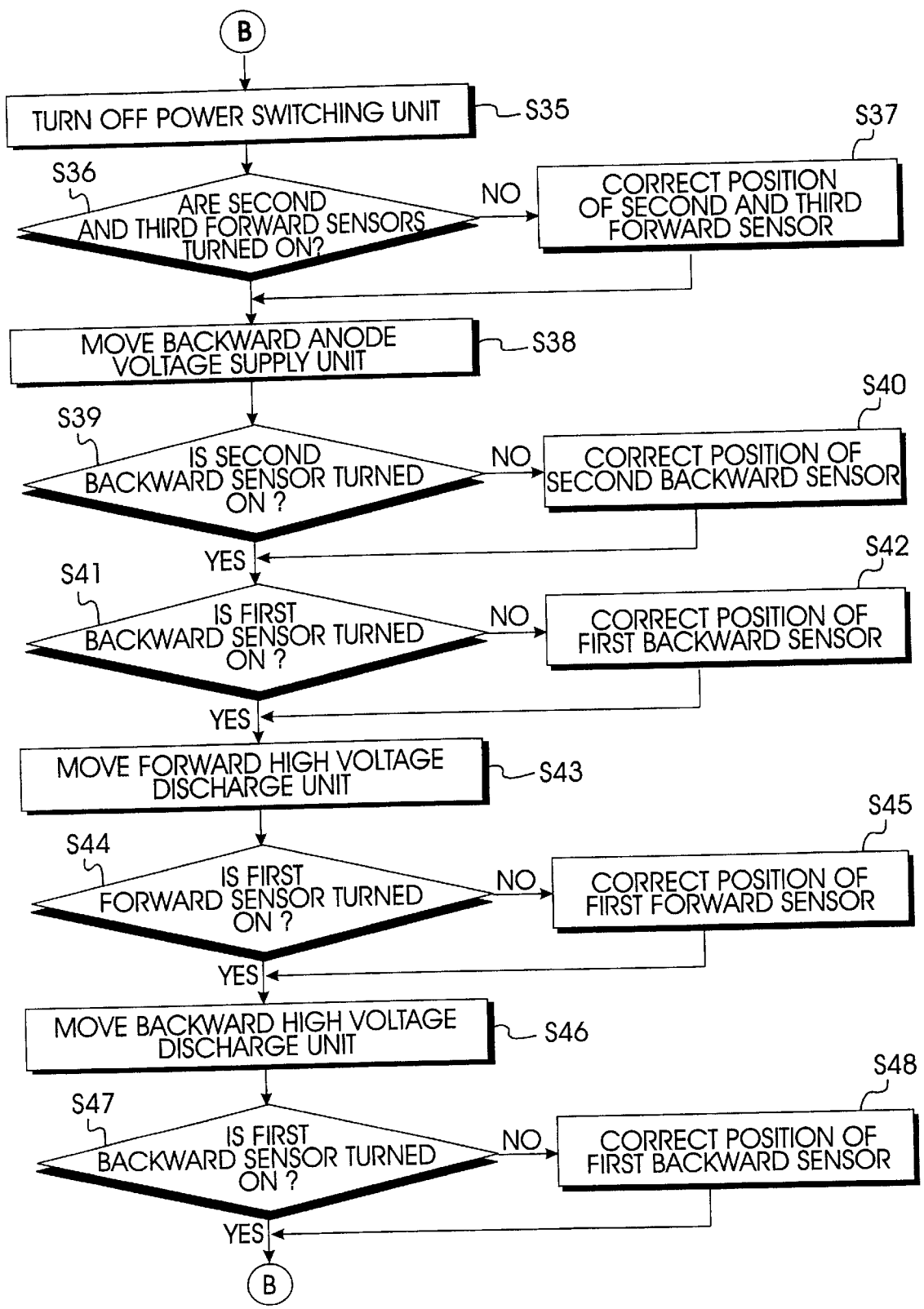
Figure 8D:
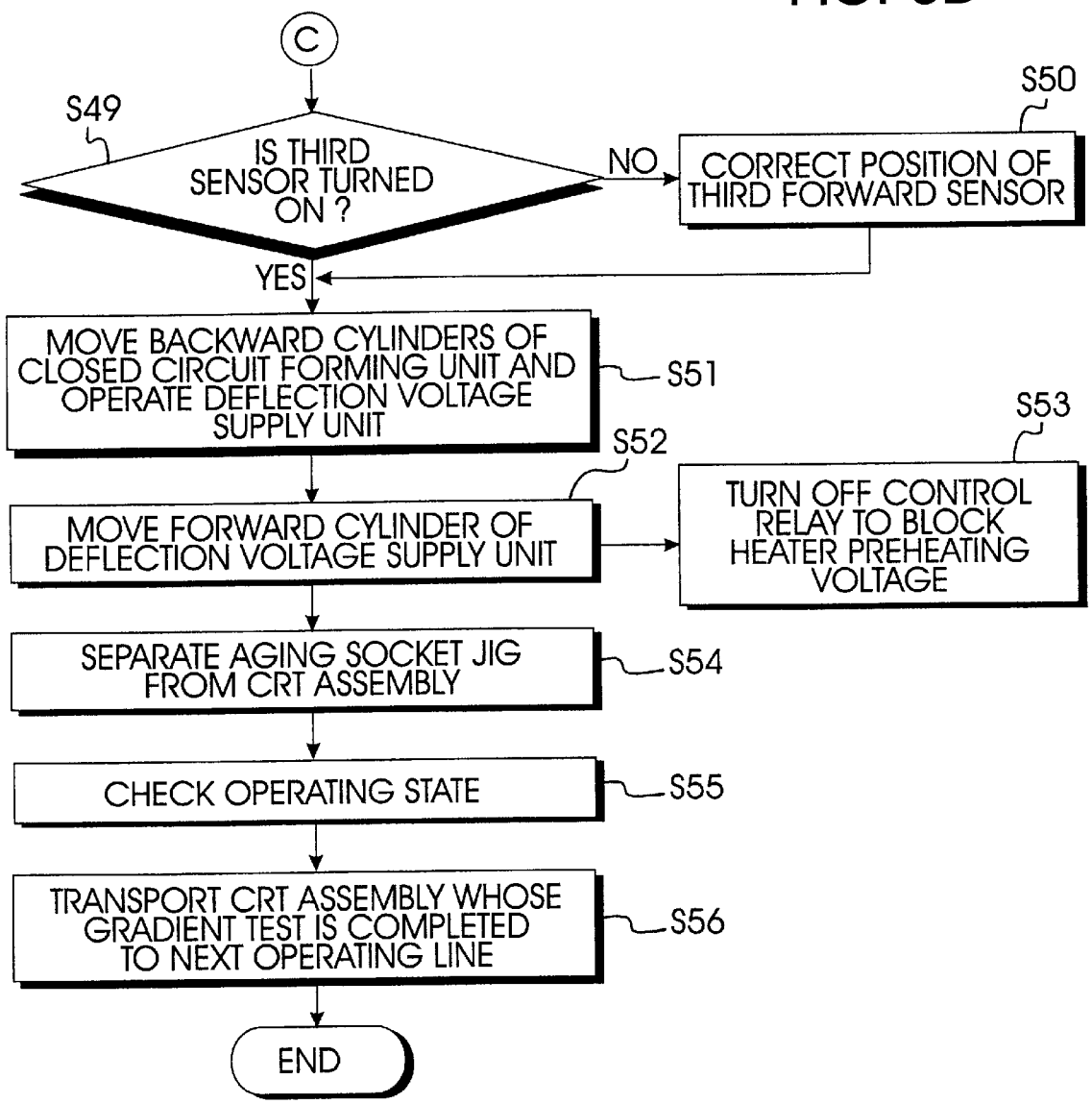

As shown in FIG. 7, the deflection voltage supply unit 206d includes a deflection yoke connector body 20 which is received in a connecting hole 28 of the deflection yoke connector 204f; a cylinder 22 and a moving rod 23 which are located at the inside of the deflection yoke connector body 20 and perform the rectilinear movement by the air pressure flown into an air pressure hose 21; a pressing unit 24 which is fixed at one end of the moving rod 23 and performs forward and backward movement by the operation of the cylinder 22; a pin board 25 which is connected to an end of the pressing unit 24 and fixed at a plurality of connecting pins 27 which are received in a pin hole 29 of the deflection yoke connector 204f; and a power supply wire 26 which is connected to the connecting pin 27 of the pin board 25 and transmits and supplies the deflection voltage to the deflection yoke connector 204f. A power connector 222 is electrically connected to the PCB assembly 210 for testing the gradient of the CRT. A signal connector 223 is also electrically connected to the PCB assembly 210 for transmitting the pattern generated by the pattern forming unit 207 to the PCB assembly 210 for testing the gradient. An anode cap 224 and an anode cap fixing jig 225 electrically connects the PCB assembly 210 and the anode voltage supply unit 206a respectively.

FIGS. 8A to 8D illustrate a process of adjusting the gradient of the CRT according to the principles of the present invention for testing and adjusting the screen gradient of the CRT automatically through the apparatus of FIGS. 3 to 7. The operation for testing and adjusting the gradient of the CRT assembly will be described in detail with reference to FIGS. 3 to 8D as follows.

In an operating line of the previous step, an operator assembles a deflection coil to which the deflection yoke connector 204f is electrically connected and another necessary materials to the neck unit 204c of the CRT 204a. After loading the assembled CRT 204 on the front case 205, the CRT 204 is mounted on the palette 220 of the conveyor belt 201 and transported to the operating line at which the apparatus for adjusting the gradient is located at step S10.

When the CRT assembly 204 whose gradient is tested is to be transported through the palette 220 of the conveyor belt 201 from the operating line, the operator who is located at the operating line where the apparatus for adjusting the gradient is placed selects the fixing plate 203 corresponding to the screen size of the CRT assembly 204. Afterwards, as shown in FIG. 4, fixing bars 203a and 203b are inserted into the fixing grooves 202a and 202b of the working plate 202 which is connected to the working plate box 200.

After fixing the fixing plate 203 at the working plate 202, the front case 205 on which the CRT assembly 204 on the palette 220 transported through the conveyor belt 201 is loaded is stably fixed at the fixing plate 203, as shown in FIG. 6. At this time, the screen of the CRT 204a faces the ground surface and the four corners of the front case 205 of the CRT assembly 204 are stably inserted and fixed to fixing protrusions 203c formed at each corners.

After that, in order to preheat the heater of the CRT 204a, the operator inserts the aging socket jig 206e of the moving and contacting unit 206 located at the working plate box 200 into the electronic gun received in the neck unit 204c of the CRT assembly 204 for connecting electrically at step S11.

When the aging socket jig 206e is electrically connected to a power terminal of the electronic gun of the CRT 204a, as shown in FIG. 3, the voltage of the common AC power is lowered in the power supply unit 208 and the lowered voltage is converted into the direct power having a predetermined level. In other words, it is converted into a direct voltage of 9V and a current of 5.5A. The converted power is applied to the aging socket jig 206e through the control relay 211b and the heater connector 211c of the preheating voltage selecting unit 211, and thereby the heater of the CRT 204a starts to be preheated. Preferably, in order to expedite the preheating of the heater of the CRT 204a, it is desirable to provide a heater preheating voltage of 9V which is higher than the conventional heater preheating voltage.

Under the state, the operator checks whether the heater of the CRT 204a is preheated at step S12. In the case that the heater is not preheated, it is determined the apparatus is not in a normal state. In addition, the operating state of the power supply unit 208, the connection of the cable which connects the power supply unit 208 and the aging socket jig 206e, and other electrical contact state are checked at step S13. In the case that the cable or the power supply unit 208 is in an abnormal state, it is exchanged and then the heater of the CRT 204a are preheated normally.

When the heater of the CRT 204a starts to be preheated, the operator connects electrically the deflection voltage supply unit 206d of the moving and contacting unit 206 to the deflection yoke connector 204f of the CRT assembly 204 which will be explained in FIG. 7 at step S14. In addition, in order to initiate the gradient testing, the start switch 216 such as a push button switch which is located at the front surface of the working plate box 200 is turned on at step S115.

When the start switch 216 is turned on, in order to execute the closed circuit forming unit 206c, the anode voltage supply unit 206a and the high voltage discharge unit 206b such as the cylinder of the moving and contacting unit 206 in an automatic mode according to the program, a main controller (not illustrated in the drawing) checks whether the CRT assembly 204 fixed at the fixing plate 203 are located at proper position through the set location sensing unit 218 and senses the operation of the closed circuit forming unit 206c, the anode voltage supply unit 206a and the high voltage discharge unit 206b of the moving and contacting unit 206, thereby checking whether the first to third forward sensors 10 to 12 and the first to third backward sensors 13 to 15 normally operate at step S16.

When the set location sensing unit 218 does not sense normally or a sensor guiding unit such as the first to third forward sensors 10 to 12 and the first to third backward sensors 13 to 15 do not operate normally, even when the CRT assembly 204 fixed at the fixing plate 203 is located at the proper position at step S16, the operations of the closed circuit forming unit 206c, the anode voltage supply unit 206a and the high voltage discharge unit 206b are not controlled. Accordingly, it is necessary to optionally correct the sensed position points so that the sensors can operate normally at step S17. In order words, the sensors emit light only when they perform the normal sensing operation, and supply the sensed electrical signal to the main controller.

As described, in the case of correcting the position points of each sensor, the main controller senses whether the closed circuit forming unit 206c such as the cylinder is in the backward direction through the third backward sensor 15 at step S18. When the third backward sensor 15 is not turned in the case state that the closed circuit forming unit 206c is in the backward direction at step S18, the operator checks this and corrects the sensed position point of the third backward sensor 15 at step S19.

In the case that the third backward sensor 15 is turned on at step S118, the main controller contacts the closed circuit forming unit 206c of the moving and contacting unit 206 to the ground unit 204d of the CRT assembly 204 by moving forward the closed circuit forming unit 206c, thereby forming the closed circuit to the PCB assembly 210 for testing the gradient of CRT at step S20.

In this situation, an air pressure generated by a compressor (not illustrated) is used as power source of the closed circuit forming unit 206c, the anode voltage supply unit 206a, and the high voltage discharge unit 206b such as the cylinder of the moving and contacting unit 206. In order words, the forward operations of the closed circuit forming unit 206c, the anode voltage supply unit 206a and the high voltage discharge unit 206b are performed by supplying the air pressure generated by the compressor in which a flow path is bidirectional and a flow path opening/closing unit such as a solenoid valve (not illustrated) which supplies or discharges a fluid pressure is operated. The backward operations of them are performed by discharging the air pressure. The solenoid valve is controlled by the main controller.

After contacting the closed circuit forming unit 206c such as the cylinder to the ground unit 204d of the CRT assembly 204 by moving forward the closed circuit forming unit 206c, the main controller senses whether the closed circuit forming unit 206c is in the forward direction through the third forward sensor 12 at step S21. In the case that the third forward sensor 12 is not turned on at is step 21 even when the closed circuit forming unit 206c moves forward and is contacted to the ground unit 204d of the CRT assembly 204, the operator checks this fact and corrects again the position of the third forward sensor 12 at step S22.

In addition, when the third forward sensor 12 is turned on, the main controller senses whether the high voltage discharge unit 206b and the anode voltage supply unit 206a of the moving and contacting unit 206 are in the backward direction through the first and second backward sensors 13 and 14 at step S23.

In the case that the first and second backward sensors 13 and 14 are not turned on even when the high voltage discharge unit 206b and the anode voltage supply unit 206a are in the backward direction at step S23, the operator corrects the positions of the first and second backward sensors 13 and 14 at step S24.

When the first and second backward sensors 13 and 14 are turned on at step S23, the main controller moves forward the anode voltage supply unit 206a of the moving and contacting unit 206 and contacts the anode voltage supply unit 206a to the anode 204b of the CRT assembly 204 at step S25. In this situation, the closed circuit forming unit 206c is firstly contacted to the ground unit 204d of the CRT assembly 204 and then the anode voltage supply unit 206a is contacted to the anode 204b. It is because the CRT assembly 204 and the PCB assembly 210 for testing the gradient can be broken in the case that only the high voltage is supplied to them through the anode voltage supply unit 206a.

As described, in the state that the closed circuit forming unit 206c and the anode voltage supply unit 206a move forward and are contacted to the ground unit 204d and the anode 204b of the CRT assembly 204 respectively, the main controller checks whether the closed circuit forming unit 206c and the anode voltage supply unit 206a are in the forward direction through the second and third forward sensors 12 and 11 at step S26, and performs step S28 when they are in the forward direction. In the case that second and third forward sensors 12 and 11 are not turned on even when the closed circuit forming unit 206c and the anode voltage supply unit 206a move forward and are contacted to the ground unit 204d and the anode 204b respectively, the operator corrects again the positions of the second and third forward sensors 12 and 11 at step S27.

When the forward direction of the closed circuit forming unit 206c and the anode voltage supply unit 206a is sensed through the second and third forward sensors 12 and 11, the main controller electrifies the power switching unit 209 such as the control relay in FIG. 3 (step 28) and supplies the common AC power of 60 Hz to the PCB assembly 210 for testing the gradient through the power connector 222. As a result, as the PCB assembly 210 for testing the gradient operates, the high voltage and the deflection voltage are generated. In addition, the main controller receives the gradient test pattern from the pattern forming unit 207 through the signal connector 223.

The high voltage generated by the PCB assembly 210 for testing the gradient is supplied to the anode 204b of the CRT assembly 204 in which the closed circuit is formed by the closed circuit forming unit 206c through the anode cap 224, the anode cap fixing jig 225 and the anode voltage supply unit 206a which is connected to the anode cap fixing jig 225 by a cable. The pattern signal for testing the gradient which is input by the pattern forming unit 207 is supplied to the aging socket jig 206e which is connected to the neck unit 204c of the CRT assembly 204 through the PCB 211a and the CRT socket jig 211d of the preheating voltage selecting unit 211.

The heater preheating voltage is generated at the PCB assembly 210 for testing the gradient and supplied to the preheating voltage selecting unit 211. Here, a plus (+) terminal of the preheating voltage is not connected to the aging socket jig 206e. Only a minus (−) terminal is commonly connected to a minus (−) terminal of the preheating voltage of the heater connector 211c and connected to the aging socket jig 206e. As a result, the heater preheating voltage which is supplied from the PCB assembly 210 for testing the gradient is actually blocked.

Afterwards, when the high voltages, i.e., the anode voltage and the deflection voltage are supplied from the PCB assembly 210 for testing the gradient, the CRT 204a of the CRT assembly 204 operates and displays the pattern image on the screen through the aging socket jig 206e. At this time, the operator checks whether the CRT assembly 204 normally operates at step S29.

When the CRT assembly 205 operates normally, next step S30 is performed. In the case that the CRT assembly 204 does not operate stably, a light emitting element equipped in the PCB assembly 210 for testing the gradient is turned off. At this time, the operator repeatedly performs the steps 10 to 28 once or twice. In the case that the CRT assembly 204 still operates unstably even after performing the steps repeatedly, the operator confirms the PCB assembly 210 for testing the gradient to be inferior.

When the CRT assembly 204 operates normally at step S29, the first and second cameras 212 and 213 pick up the pattern image for testing the gradient displayed on the screen of the CRT 204a and then display the picked-up pattern image on the first and second monitors 214 and 215 located at the upper part of the working plate box 200 at step S30.

When the pattern image for testing the gradient is displayed on the screen, the operator checks the gradient of the screen by confirming whether the displayed pattern image is parallel to the reference patterns 219 and 219a which are horizontally established at the upper end of the first and second monitors 212 and 213 respectively at step S31. In the case that the gradient of the pattern image and that of the reference patterns 219 and 219a are not the same, the position of the CRT 204a is controlled based on the front case 205 and adjusted the gradient of the pattern image and the reference patterns 219 and 219a to be parallel each other at step S32.

It is possible to locate the reference patterns 219 and 219a apart from the first and second monitors 212 and 213 by a predetermined distance. Preferably, it is better to display by underlining horizontally on the screen surface of one monitor out of the first and second monitors 212 and 213.

As described, after correcting the gradient, the operator assembles the CRT 204a of the CRT assembly 204 and the front case 205 with a locking unit such as a screw at step S33 and completes the testing and adjusting the gradient by pressing the stop switch 217 such as a push button switch located at the front surface of the working plate box 200 at step S34.

When the stop switch 217 is pressed, the main controller blocks the power supplied to the PCB assembly 210 for testing the gradient by allowing the power switching unit 209 such as a control relay as shown in FIG. 3 to be turned off at step S35. In addition, the main controller checks whether the anode voltage supply unit 206a and the closed circuit forming unit 206c are in the forward direction through the second and third forward sensors 11 and 12 at step S36.

In the case that the anode voltage supply unit 206a and the closed circuit forming unit 206c are not sensed even when they are located in the forward direction at step 36, the operator corrects the positions of the second and third forward sensors 11 and 12 at step S37. When they are sensed, the main controller moves backward only the anode voltage supply unit 206a at step S38.

Afterwards, the main controller checks whether the anode voltage supply unit 206a is in the backward direction through the second backward sensor 14 at step S39, and the operator corrects the position of the second backward sensor 14 when the anode voltage supply unit 206a is not in the backward direction at step S40. When the anode voltage supply unit 206a is in the backward direction, the main controller checks whether the high voltage discharge unit 206b is in the backward direction through the first backward sensor 13 at step S41.

When the first backward sensor 13 is not turned on as shown in FIG. 5 even when the high voltage discharge unit 206b is in the backward direction at step S41, the operator corrects the sensed position of the first backward sensor 13 and allow the first backward sensor 13 to be turned on at step S42. When the backward direction is sensed, the main controller moves forward the high voltage discharge unit 206b and contacts to the anode 204b of the CRT assembly 204 in which the CRT 204a and the front are assembled during a predetermined time at step S43.

After that, the main controller checks whether the high voltage discharge unit 206b is located in the forward direction through the first forward sensor 10 at step S44. When the high voltage discharge unit 206b is located in the forward direction, next step S46 is performed. In the case that the first forward sensor 10 is not turned on even when the high voltage discharge unit 206b is in the forward direction, the operator corrects the position of the first forward sensor 10 at step S45.

As described, when the high voltage discharge unit 206b is contacted to the anode 204b, the high voltage which is charged in the CRT 204a bypasses to the PCB assembly 210 for testing the gradient through the high voltage discharge unit 206b and the closed circuit forming unit 206c. As a result, in the following operating lines, death from shock caused by the high voltage can be prevented.

It is possible to discharge the high voltage by locating the high voltage discharge unit 206b in the following operating line. However, since death from shock can be caused by an error of the operator during the CRT assembly 204 having remaining high voltage is transported to the next operating line, it is preferable to discharge the high voltage previously in the operating line where the apparatus for adjusting the gradient is located.

When a predetermined time elapses after the high voltage, i.e., the anode voltage is discharged, the high voltage discharge unit 206b moves backward at step S46 and the same operations as steps 41 and 42 are performed at steps S47 and S48. In the case that the high voltage discharge unit 206b is in the backward direction at step S47, the main controller checks whether the closed circuit forming unit 206c is in the forward direction through the third forward sensor 12 at step S49.

When the third forward sensor 12 is not turned on even when the closed circuit forming unit 206c is in the forward direction as shown in FIG. 5, the operator corrects the position of the third forward sensor 12 and allows the third forward sensor 12 to be turned on at step S50. When the third forward sensor 12 is turned on, the main controller moves backward the closed circuit forming unit 206 and blocks the closed circuit between the CRT assembly 204 and the PCB assembly 210 for testing the gradient of the CRT. In addition, the main controller controls the deflection voltage supply unit 206d and separates it from the deflection yoke connector 204f at step S51.

In other words, at step S14, the operator electrically connects the deflection voltage supply unit 206d to the deflection yoke connector of the CRT assembly 204. However, at step S50, as shown in FIG. 7, the deflection voltage supply unit 206d and the deflection yoke connector 204f are operated and separated when the closed circuit forming unit 206c moves backward.

The separating operation is performed as follows. The cylinder 22 and the moving rod 23 mounted inside of the body 20 of the deflection voltage supply unit 206d move backward due to the suction operation to the air pressure hose 21. Moreover, the pressing unit 24 fixed at one end of the moving rod 23 starts to be escaped from the connecting hole 28 of the deflection yoke connector 204f by the backward movement of the moving rod 23. The connecting pins 27 of the pin board 25 which are fixed at one end of the pressing unit 24 are escaped from the pin hole 29 of the deflection yoke connector 204f. As a result, the deflection voltage supply unit 206d is separated from the deflection yoke connector 204f.

When a predetermined time elapses after separating the deflection voltage supply unit 206d from the deflection yoke connector 204f or when the third backward sensor 15 of the closed circuit forming unit 206c operates, the main controller moves forward the cylinder 22 and the moving rod connected to the cylinder 22 mounted inside of the body 20 of the deflection voltage supply unit 206d by the air pressure flown from the air pressure hose 21 at step S52. In addition, by turning off the control relay 211b of FIG. 3, the heater preheating voltage of the power supply unit 208 is blocked at step 53. In this situation, the reason of moving forward the cylinder 22 of the deflection voltage supply unit 206d is to easily connect the cylinder 22 to the deflection yoke connector 204f of the CRT assembly 204 which is the next target product transported through the conveyor belt 201.

When the moving rod 23 of the deflection voltage supply unit 206d moves forward and the heater preheating voltage is blocked, the operator finally separates the aging socket jig 206e which is inserted into the neck unit 204c of the CRT assembly 204 at step S54 and checks the operating state at step S55. Afterwards, the CRT assembly 204 whose gradient test is completed is transported to the next operating line being loaded on the palette 220 at step S56. At this time, the discharging set sensing unit 221 senses the CRT assembly 204, thereby automatically transporting the same.

The CRT assembly 204 is connected to the PCB assembly by the operator in the next operating line. Steps 13 to 53 are directly performed by the operator for testing the gradient. In the case of testing the CRT assemblies 204 having a same screen size, the sensed position does not vary by the operation which is set once. In the case that the screen sizes of the CRT assemblies 204 vary, it is necessary to adjust the position according to the size. The sensed position point is adjusted not at all times. It is necessary to adjust the sensed position point when the CRT assemblies 204 having the difference screen sizes are transported.

Moreover, the above explanation is directed to the forward and backward operations in the automatic mode. It is also possible to perform the forward and backward operations in the manual mode. In other words, it is possible to selectively move forward or backward by providing each switch corresponding to the anode voltage supply unit 206a, the closed circuit forming unit 206c, the high voltage discharge unit 206b and the deflection voltage supply unit 206d on the working plate box 200 instead of pressing the start switch 216.

As described above, the anode voltage supply unit 206a, the closed circuit forming unit 206c and the high voltage discharge unit 206b use the cylinder. It is also possible to use another moving device. Differently from the conventional art in which the screw is tightened/loosened whenever the gradient test is performed in the case that the CRT assembly and the front case are assembled with the screw and the operator directly supplies the high voltage and the gradient test pattern to the CRT assembly, the present invention automatically supplies the high voltage and the gradient test pattern before assembling the CRT assembly to the front case and then assembles them after testing and adjusting the gradient. As a result, it is possible to enhance the productivity in testing the gradient of the video display device and minimize the inferiority of the gradient caused by the automatic test.

As described above, in the preferred embodiment of the present invention, the high voltage and the gradient test pattern are automatically supplied using the operating unit such as the cylinder, thereby reducing the delay of time caused by the manual supply and removing the error occurred in testing and adjusting the gradient. In addition, unnecessary operations are reduced in testing and adjusting the gradient of the video display device, and the time for testing the gradient is noticeably reduced, and thereby the stabilization of the product quality can be realized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for adjusting a gradient of a video display device in which a common alternating current power, a deflection voltage and a gradient test pattern are supplied to a printed circuit board of a cathode ray tube and gradients of a front case and said cathode ray tube are tested, comprising the steps of:

locating said front case on which said cathode ray tube is loaded, on a working plate;

supplying said common alternating current power, a heater preheating voltage and said gradient test pattern to said cathode ray tube and displaying a pattern image on a screen of said cathode ray tube;

picking up a displayed pattern image by an image pickup unit; and adjusting the position of said cathode ray tube so that a picked-up pattern image and a reference pattern can be parallel each other after comparing said picked-up pattern image with said reference pattern located at the screen of said cathode ray tube, and then assembling said cathode ray tube to said front case.

2. The method of claim 1, wherein said gradient test pattern is directly supplied to an electronic gun of said cathode ray tube before assembling said printed circuit board.

3. The method of claim 1, wherein said gradient test pattern is provided after supplying said heater preheating voltage to an electronic gun of said cathode ray tube and preheating a heater of said electronic gun.

4. The method of claim 3, wherein said heater preheating voltage which is higher than a reference heater preheating voltage is provided to expedite the preheating of said heater of said cathode ray tube.

5. The method of claim 4, wherein said heater preheating voltage of said heater is 9 Volts.

6. A method for adjusting a gradient of a video display device, comprising the steps of:

locating a front case on which a cathode ray tube is loaded, on a working plate;

supplying a heater preheating voltage by inserting an aging socket jig into an electronic gun of said cathode ray tube;

supplying a deflection voltage by inserting a deflection voltage supply unit to a deflection yoke connector of said cathode ray tube;

forming a closed circuit by contacting a closed circuit forming unit to a ground point of said cathode ray tube;

supplying an anode voltage by contacting an anode voltage supply unit to an anode of said cathode ray tube;

supplying a gradient test pattern to the electronic gun of said cathode ray tube through an aging socket jig and then displaying the supplied gradient test pattern on a screen of said cathode ray tube;

picking up the displayed gradient test pattern by an image pickup unit and displaying a picked-up test pattern on a monitor; and adjusting the position of said cathode ray tube so that said picked-up test pattern displayed on the monitor and a reference pattern located at the screen of the monitor can be parallel each other and then assembling said cathode ray tube to said front case.

7. The method of claim 6, further discharging said anode voltage by contacting a high voltage discharge unit to said anode of said cathode ray tube after assembling said cathode ray tube to said front case.

8. The method of claim 6, wherein said aging socket jig, deflection voltage supply unit, closed circuit forming unit and anode voltage supply unit are detached in reverse order after said cathode ray tube and said front case are assembled.

9. The method of claim 6, wherein said heater preheating voltage which is higher than a reference heater preheating voltage is provided to said aging socket jig to expedite the preheating of said heater of said cathode ray tube.

10. An apparatus for adjusting a gradient of a video display device, comprising:

a fixing unit for stably fixing a front case on which a cathode ray tube is loaded;

a pattern forming unit which forms a test pattern for testing the gradient of said cathode ray tube;

a printed circuit board for testing the gradient which generates an anode voltage, a deflection voltage and a heater preheating voltage based on a common alternating current power and receives and transmits the test pattern from said pattern forming unit;

means selectively attachable and detachable to/from said cathode ray tube for supplying said anode voltage, said deflection voltage, said heater preheating voltage and a pattern signal obtained by said printed circuit board for testing the gradient of said cathode ray tube;

at least one image pickup unit which is located at a predetermined position of said fixing unit for picking up the test pattern displayed on the screen of said cathode ray tube; and a monitor unit having a reference pattern for monitoring the gradient of said cathode ray tube by displaying said test pattern which is obtained by said image pickup unit.

11. The apparatus of claim 10, wherein said means for supplying said anode voltage, said deflection voltage, said heater preheating voltage and said pattern signal comprises:

an anode voltage supply unit which is attached/detached to/from an anode of said cathode ray tube by a rectilinear movement when testing the gradient and transmits and supplies a high voltage of said printed circuit board for testing the gradient;

a closed circuit forming unit which is attached/detached to/from a ground point of said cathode ray tube by the rectilinear movement and forms a closed circuit;

an aging socket jig which is attachably/detachably connected to an electronic gun of said cathode ray tube and transmits and supplies said heater preheating voltage and said gradient test pattern; and a deflection voltage supply unit which is attachably/detachably connected to a deflection yoke connector of said cathode ray tube and transmits and supplies said deflection voltage.

12. The apparatus of claim 11, wherein each of said anode voltage supply unit and closed circuit forming unit are operated by a cylinder which performs the rectilinear movement by an air pressure.

13. The apparatus of claim 11, wherein said deflection voltage supply unit comprises:

a deflection yoke connector body which is received in a connecting hole of said deflection yoke connector;

a cylinder and a moving rod which are mounted at the inside of said deflection yoke connector body and perform a rectilinear movement by an air pressure;

a pressing unit which is fixed at an end of said moving rod and performs a forward/backward movement by the operation of said cylinder;

a pin board which is fixed at an end of said pressing unit and at which a plurality of connecting pins received in a pin hole of said deflection yoke connector are fixed; and a power supply wire which is connected to said connecting pin of said pin board and transmits and supplies the deflection voltage to said deflection yoke connector.

14. The apparatus of claim 11, wherein said heater preheating voltage which is higher than a reference heater preheating voltage is provided to said aging socket jig to expedite the preheating of said heater of said cathode ray tube.

15. The apparatus of claim 11, wherein said means for supplying said anode voltage, said deflection voltage, said heater preheating voltage and said pattern signal comprises a high voltage discharge unit which is attached/detached to/from said anode of said cathode ray tube by the rectilinear movement after testing the gradient and discharges the anode voltage which is charged to said printed circuit board for testing the gradient.

16. The apparatus of claim 15, wherein said high voltage discharge unit is operated by a cylinder which performs a rectilinear movement by the air pressure.

17. The apparatus of claim 10, wherein said fixing unit includes fixing protrusions which are formed four corners of said front case and has the same height corresponding to the size of said front case.

18. The apparatus of claim 10, wherein said image pickup unit comprises at least two (2) cameras.

19. The apparatus of claim 10, wherein said reference pattern is a displayed line which is underlined horizontally on the surface of the screen of said monitor.

20. An apparatus for adjusting a gradient of a video display device which tests gradients of a cathode ray tube assembly and a front case by supplying a common alternating current power, a deflection voltage, an anode voltage and a gradient test pattern to the cathode ray tube assembly, said apparatus comprising:

a fixing unit for stably fixing said front case loading said cathode ray tube assembly which is transported being located at a working plate on a conveyer belt;

a pattern forming unit which forms the gradient test pattern for testing the gradient of the cathode ray tube assembly;

a printed circuit board for testing the gradient which generates said anode voltage, said deflection voltage and a heater preheating voltage based on the common alternating current power and generates the gradient test pattern obtained by said pattern forming unit;

a compressing unit which generates an air pressure by compressing outside air, when testing the gradient of the cathode ray tube assembly;

a flow path opening/closing unit for deflating/inflating air by opening/closing a flow path of the air pressure generated by said compressing unit;

means for selectively being attached/detached to/from said cathode ray tube assembly with the rectilinear movement by the air pressure as said flow path opening/closing unit opens/closes the flow path and supplying said anode voltage, said deflection voltage, said heater preheating voltage and said pattern signal which are obtained from said printed circuit board for testing the gradient;

at least one image pickup unit which is located at a proper position of said fixing unit and picks up said pattern image displayed on the screen of said cathode ray tube assembly;

a monitor having a reference pattern for monitoring the gradient by displaying said pattern image which is obtained by said image pickup unit;

a high voltage discharge unit for discharging said anode voltage by contacting to said cathode ray tube assembly for a predetermined time by said air pressure caused by the opening/closing of the flow path of said flow path opening/closing unit after testing the gradient and then being detached; and a sensing and guiding unit for sensing and guiding whether said moving and contacting unit and said high voltage discharge unit are attached/detached to/from said cathode ray tube assembly.

21. The apparatus of claim 20, wherein said moving and contacting unit comprises:

an anode voltage supply unit which is attached/detached to/from an anode of said cathode ray tube assembly by the air pressure of said flow path opening/closing unit when testing the gradient and transmits and supplies a high voltage of said printed circuit board for testing the gradient;

a closed circuit forming unit which is attached/detached to/from a ground point of said cathode ray tube assembly by the air pressure of said flow path opening/closing unit and forms a closed circuit;

an aging socket jig which is attachably/detachably connected to an electronic gun of said cathode ray tube assembly and transmits and supplies said heater preheating voltage and said gradient test pattern; and a deflection voltage supply unit which is attachably/detachably connected to a deflection yoke connector of said cathode ray tube assembly and transmits and supplies said deflection voltage.

22. The apparatus of claim 20, wherein said sensing and guiding unit includes a sensor which is located in forward and backward directions of each of said anode voltage supply unit and closed circuit forming unit, respectively and displays optically forward and backward states.

23. The apparatus of claim 21, wherein said sensing and guiding unit includes a sensor which is located in forward and backward directions of each of said anode voltage supply unit and closed circuit forming unit, respectively and displays optically forward and backward states.

24. The apparatus of claim 21, wherein each of said anode voltage supply unit and closed circuit forming unit are operated by a cylinder which performs the rectilinear reciprocal movement by said air pressure.

25. The apparatus of claim 20, wherein said deflection voltage supply unit comprises:

a deflection yoke connector body which is received in a connecting hole of said deflection yoke connector;

a cylinder and a moving rod which are mounted at the inside of said deflection yoke connector body and perform the rectilinear movement by the air pressure of said flow path opening/closing unit;

a pressing unit which is fixed at an end of said moving rod and performs a forward/backward movement by the operation of said cylinder;

a pin board which is fixed at an end of said pressing unit and at which a plurality of connecting pins received in a pin hole of said deflection yoke connector are fixed; and a power supply wire which is connected to said connecting pin of said pin board and transmits and supplies the deflection voltage to said deflection yoke connector.

26. The apparatus of claim 20, wherein said reference pattern is a displayed line which is underlined horizontally on the surface of the screen of said monitor.

* * * * *